(12) United States Patent
Angelastro (10) Patent No.: US 11,632,909 B2
(45) Date of Patent: Apr. 25, 2023

(54) DIRECT SURFACE CONTACT VEGETATION TRIMMER

(71) Applicant: Leonard W. Angelastro, North Franklin, CT (US)

(72) Inventor: Leonard W. Angelastro, North Franklin, CT (US)

(*) Notice: Subject to any disclaimer, the term of this patent is extended or adjusted under 35 U.S.C. 154(b) by 206 days.

(21) Appl. No.: 16/999,593

(22) Filed: Aug. 21, 2020

(65) Prior Publication Data

US 2021/0051852 A1    Feb. 25, 2021

Related U.S. Application Data

(60) Provisional application No. 62/890,382, filed on Aug. 22, 2019.

(51) Int. Cl.
  *A01D 75/20*    (2006.01)
  *A01D 34/46*    (2006.01)
  *A01D 34/52*    (2006.01)
  *A01D 75/18*    (2006.01)
  *A01D 34/90*    (2006.01)

(52) U.S. Cl.
  CPC ............. *A01D 75/20* (2013.01); *A01D 34/46* (2013.01); *A01D 34/52* (2013.01); *A01D 34/90* (2013.01); *A01D 75/185* (2013.01)

(58) Field of Classification Search
  CPC ........ A01D 75/20; A01D 34/36; A01D 34/90; A01D 75/185; A01D 34/52; A01D 34/84; A01D 75/18; A01D 34/733; A01D 34/416; A01D 34/73; A01D 34/736; A01D 34/4166; A01D 34/828; A01D 34/4167; A01D 75/206; A01G 3/062
  USPC ............ 30/276, 286, 347, 388–391; 56/12.7, 56/17.1, 17.5, 13.7, 320.2, 13.4, 12.8; 172/14, 15
  See application file for complete search history.

(56) References Cited

U.S. PATENT DOCUMENTS

| | | | | |
|---|---|---|---|---|
| 3,126,968 A | * | 3/1964 | Booth | A01D 34/84 |
| | | | | 56/247 |
| 3,897,630 A | * | 8/1975 | Glover | A01G 3/053 |
| | | | | 56/297 |
| 4,916,813 A | * | 4/1990 | Elia | A01D 34/90 |
| | | | | 30/276 |
| 5,239,755 A | * | 8/1993 | Kramer | A01D 34/73 |
| | | | | 30/263 |
| 6,076,265 A | * | 6/2000 | Huang Lo | A01D 34/76 |
| | | | | 56/255 |

(Continued)

*Primary Examiner* — Ghassem Alie
(74) *Attorney, Agent, or Firm* — Coleman & MacDonald Law Office (57) ABSTRACT

A vegetation trimmer having a blade guard and a drive motor and an elongated drive shaft coupled to the drive motor is disclosed. The blade guard is coupled to the power head assembly, a cutting blade is attached to an output shaft of the power head assembly for rotation relative to the blade guard. The cutting blade being rotatable relative to the blade guard for cutting vegetation when the vegetation trimmer is operational. The blade guard having a diameter larger than a diameter of the cutting blade for protecting the blade and structures near or against where the vegetation trimmer is used. The blade guard defining a plurality of shear openings for receiving vegetation to be cut via the vegetation trimmer.

11 Claims, 11 Drawing Sheets

(56) References Cited

U.S. PATENT DOCUMENTS

| | | | |
|---|---|---|---|
| 7,254,891 B2 * | 8/2007 | Liu | A01D 34/828 30/388 |
| 2020/0406415 A1 * | 12/2020 | Shimizu | A01D 34/416 |
| 2021/0092911 A1 * | 4/2021 | Schiller | A01D 23/00 |

* cited by examiner

DIRECT SURFACE CONTACT VEGETATION TRIMMER

CROSS-REFERENCE TO RELATED APPLICATION

This application claims priority from U.S. Provisional Patent Application No. 62/890,382 filed Aug. 22, 2019, the entire disclosure of which is hereby incorporated by reference.

FIELD OF THE INVENTION

The present disclosure relates generally to a vegetation trimmer. More particularly, the disclosure relates to a vegetation trimmer including a blade guard defining a plane and mounted parallel to and spaced apart from a cutting blade of the vegetation trimmer for protecting the cutting blade and various structures including buildings, trees, etc. around which the vegetation trimmer may be used.

BACKGROUND OF THE INVENTION

The statements in this section merely provide background information related to the present disclosure and may not constitute prior art.

Many different types of vegetation trimmers are well known in the prior art. Most prior art vegetation trimmers currently in use are known as string trimmers which include a rapidly spinning monofilament line as a cutting tool for trimming grass and vegetation. Various types of cutting heads are utilized with string trimmers to hold the monofilament line which tends to break and often requires replacement.

Other types of vegetation trimmers use rotating cutting blades. Bladed trimmers work nearly the same as a string trimmer, except there are blades attached to the cutting head rather than monofilament line. The blades can be plastic or metal wherein plastic blades may be used for thin foliage cover, and metal blades for denser foliage or brush.

Accordingly, it is an object of the present teachings to provide a vegetation trimmer with blade guard that overcomes the shortcomings of prior art vegetation trimmers.

SUMMARY OF THE INVENTION

According to one aspect, the present teachings provide a vegetation trimmer having a blade guard. In one embodiment, the vegetation trimmer including a drive motor and an elongated drive shaft coupled to the drive motor, the drive shaft being disposed in an elongated shaft housing having first and second ends, the first end of the shaft housing coupled to the drive motor. A power head assembly is coupled to a second end of the shaft housing. The vegetation trimmer further including a blade guard coupled to the power head assembly, and a cutting blade attached to an output shaft of the power head assembly for rotation relative to the blade guard. The cutting blade being rotatable relative to the blade guard for cutting a variety of vegetation, when the vegetation trimmer is operational. The blade guard having a diameter larger than a diameter of the cutting blade for protecting the cutting blade as well as structures adjacent where the vegetation trimmer is used.

In another aspect, the vegetation trimmer includes a foot guard attached to the blade guard and extending along a portion of the circumference of the cutting blade. The foot guard covers both the teeth of the cutting blade and a portion of the lower surface of the cutting blade for preventing the cutting blade from contacting the feet of an operator of the vegetation trimmer.

In another embodiment, the vegetation trimmer includes a power head assembly connectable to a drive shaft. The power head assembly including an input shaft and an output shaft. A blade guard is coupled to the power head assembly and a cutting blade is attached to the output shaft for rotation relative to the blade guard. The cutting blade being rotatable relative to the blade guard and cooperating therewith for cutting a wide variety of vegetation, when the vegetation trimmer is operational. The blade guard having a diameter larger than a diameter of the cutting blade for protecting the cutting blade as well as structures where the vegetation trimmer is used.

In another embodiment of the invention, a hand-held vegetation trimmer is disclosed. The hand-held vegetation trimmer having a drive motor coupled to and powered by a battery; a handle portion being disposed between the battery and the drive motor; and an output shaft coupled to the drive motor. An attachment bracket is coupled to the vegetation trimmer near the output shaft, and a blade guard is coupled to the attachment bracket. The hand-held vegetation trimmer further includes a cutting blade mounted to the output shaft for rotation relative to the blade guard via power from the drive motor. The blade guard is disposed generally parallel to the cutting blade and spaced apart from the cutting blade, the blade guard defining a plurality of spaced apart shear openings disposed about the circumference thereof. The cutting blade being rotatable relative to the blade guard for cutting vegetations, grass or other materials within the shear openings when the vegetation trimmer is operational.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description, the appended claims and the following drawings. The drawings are for illustrative purposes only and are not intended to limit the scope of the present disclosure.

DETAILED DESCRIPTION OF EMBODIMENTS OF THE INVENTION

Detailed illustrative descriptions of example embodiments are disclosed herein. However, specific structural and functional details disclosed herein are merely representative for purposes of describing example embodiments. The example embodiments may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
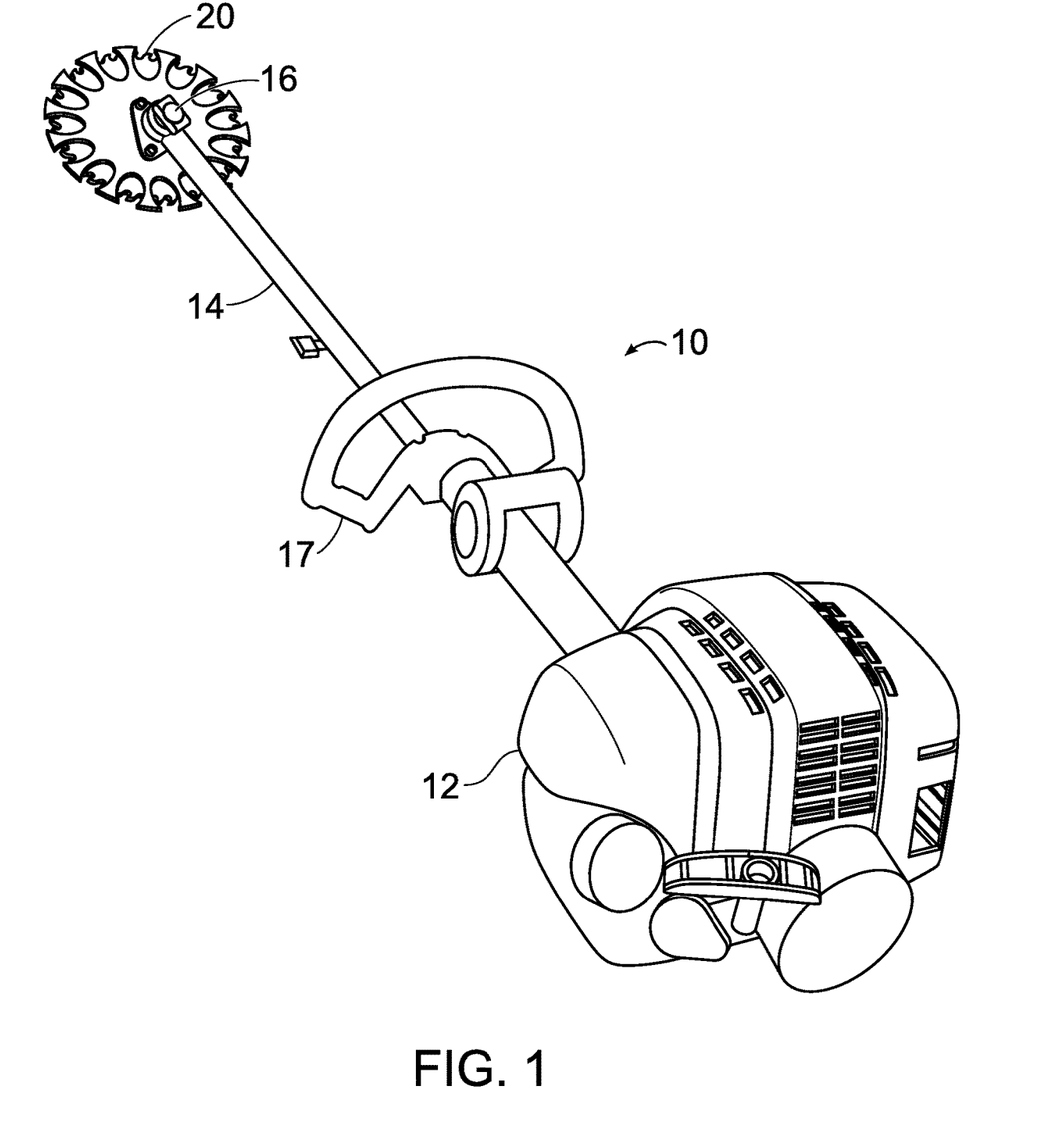
FIG. 1 is a perspective view of one embodiment of a typical vegetation trimmer in accordance with the present invention.
Figure 8:
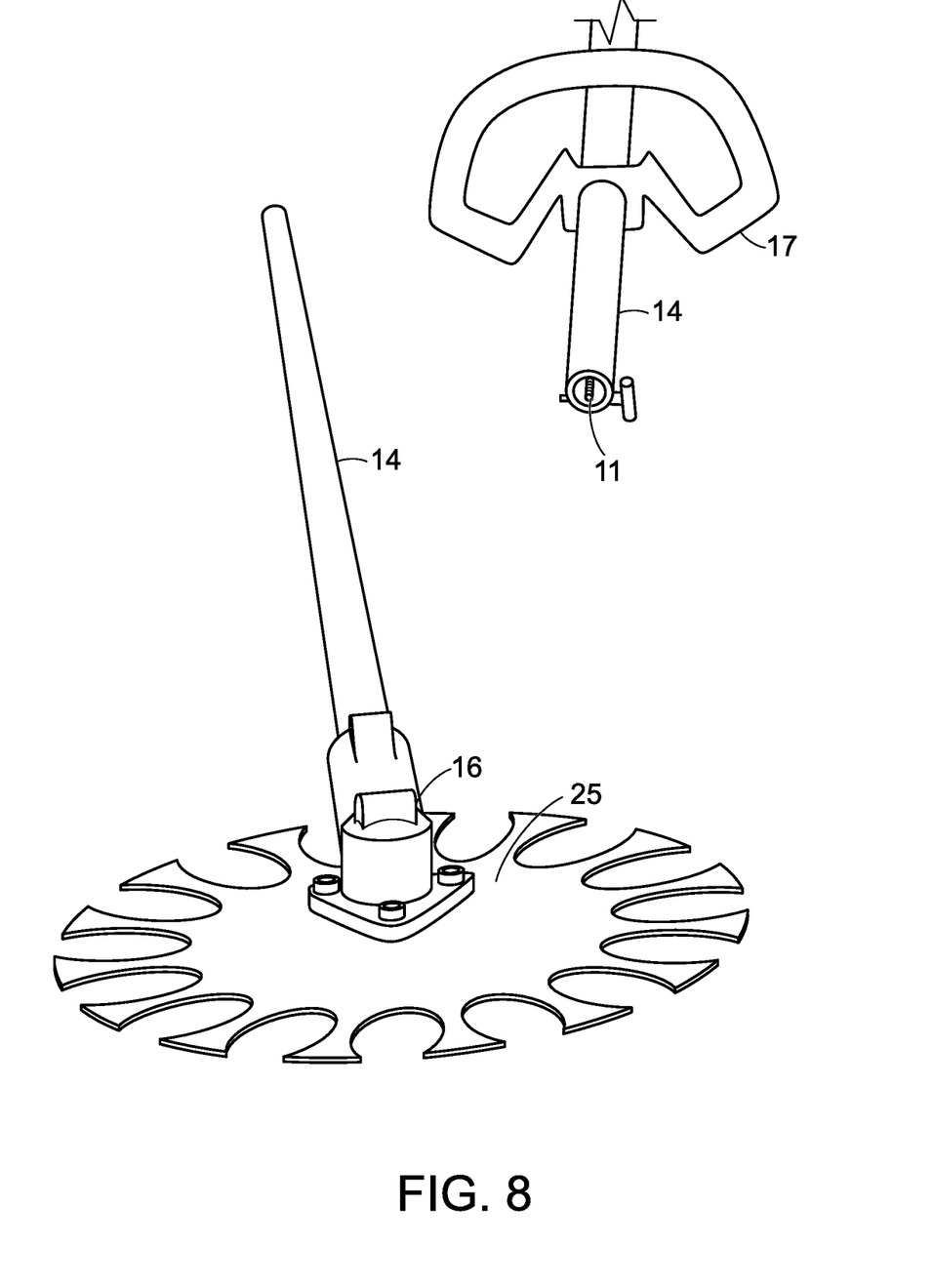
FIG. 8 is a perspective view of a vegetation trimmer of FIG. 1 with a two-piece shaft shown disconnected.

FIG. 1, shows one embodiment of a vegetation trimmer 10 in accordance with the present invention. The vegetation trimmer 10 includes a drive motor 12, a shaft housing 14, a power head assembly 16, a cutting blade 20, and blade guard 25. The vegetation trimmer 10 also includes a handle 17 coupled to the shaft housing 14. An elongated drive shaft 11 is coupled to an output shaft (not shown) of the drive motor 12 in a known manner for driving a rotatable cutting blade 20 (See FIG. 2). The drive shaft 11 is housed within the shaft housing 14 and power head assembly 16 as is well known to one skilled in the subject of vegetation trimmers. FIG. 8 shows the vegetation trimmer 10 with a two-piece shaft housing 14 and drive shaft 11 disconnected.

Figure 2:
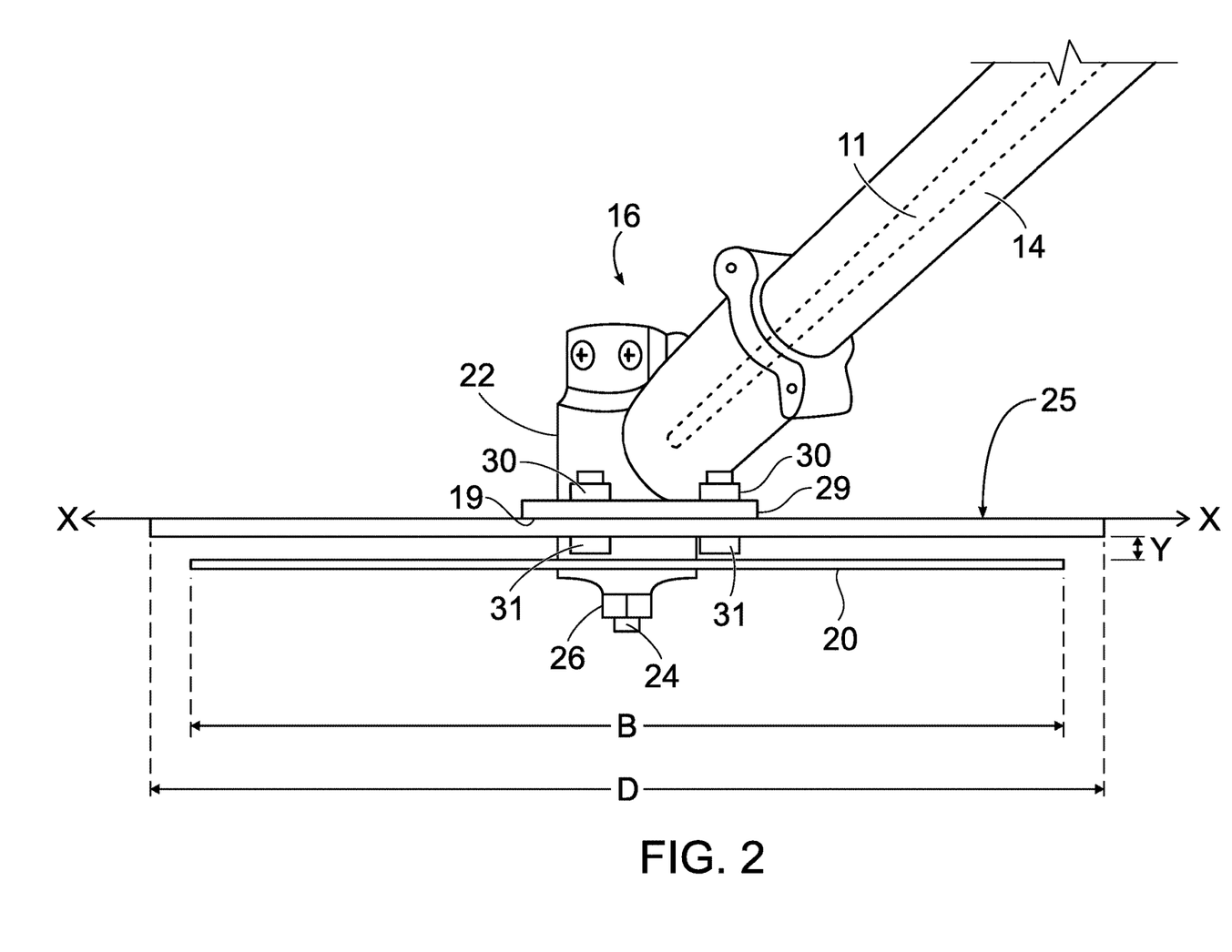
FIG. 2 is perspective view of the head assembly of the vegetation trimmer in accordance with one embodiment of the present invention.

As shown in FIG. 2, the power head assembly 16 is coupled to the shaft housing 14 and includes a gear box 22 and an output shaft 24. The cutting blade 20 is attached to the output shaft 24 via a threaded nut 26. In the FIG. 2 embodiment, a blade guard 25 is coupled to a bottom plate 29—of the power head assembly 16 via a plurality of fasteners, such as bolts 31 with threaded nuts 30 attached thereto. As shown in FIG. 2, the bolts 31 pass through the blade guard 25 and the bottom plate 29 of the power head assembly 16 and are secured with the nuts 30 for attaching the blade guard 25 to the power head assembly in a plane X-X which is parallel to a plane of the cutting blade 20.

Figure 3:
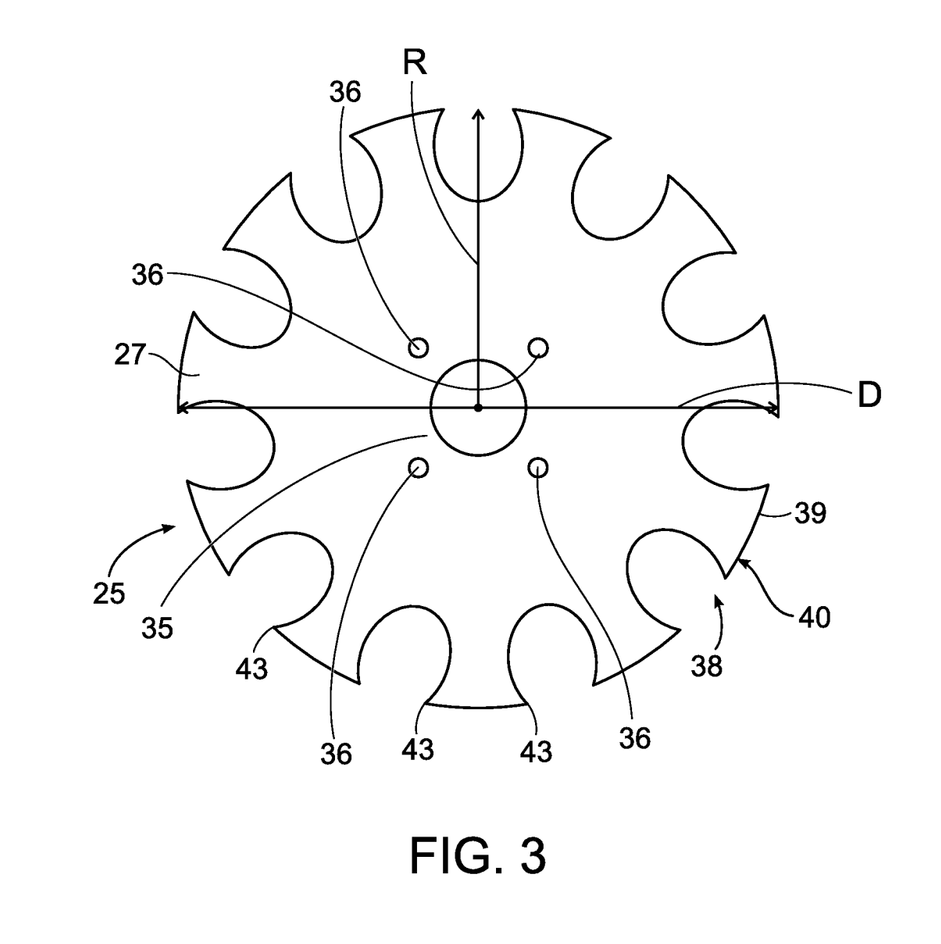
FIG. 3 is a top side view of a blade guard in accordance with the present invention.

Referring to FIGS. 2, 3 one embodiment of a blade guard 25 of the present invention includes a circular plate 27 having a diameter D designed to be slightly greater than the diameter B (FIG. 2) of the cutting blade 20 used with the blade guard 25. The blade guard 25 is designed to prevent the teeth 28 of the cutting blade 20 from contacting a structure, for example, a tree trunk, the siding of a house, a mailbox post, concrete foundations etc. wherein the vegetation trimmer 10 may be used adjacent to, or directly against such a structure (this type of structure is not shown in the Figures). With the diameter D of the blade guard 25 being larger than the diameter B of the cutting blade 20, the cutting blade 20 is protected from striking a structure such as those mentioned above and being damaged. Further, the blade guard 25 also protects the structure from being damaged by the saw blade 20. Thus, the blade guard 25 is configured to protect the cutting blade 20 from being damaged as well as the structures adjacent to or directly against which the vegetation trimmer is used. As shown in the FIGS. 4 and 5, in one embodiment of the present invention, the difference E in the diameter D of the blade guard 25 and the diameter B of the cutting blade 20 is approximately ½ inches. In other embodiments the setback of a cutline 32 of the cutting blade 20 measured from the circumference of the blade guard 25 can be greater or less than ½ inch depending on the application. In various embodiments, for use with an 8 inch cutting blade 20, the blade guard 25 has a diameter of 9 inches; with a 9 inch diameter cutting blade 20, the blade guard 25 has a diameter of 10 inches; for a 10 inch diameter cutting blade, the diameter of the blade guard is 11 inches. In another embodiment (not shown) the difference E between the diameter D of the blade guard 25 and the diameter B of the cutting blade 20 equals about ¼ (0.25) inches. Depending on the application of the vegetation trimmer and the type of vegetation to be cut, the difference E can be varied. For example, for vegetation having a large diameter, the space E between the edge of the blade guard and the cut line 32 can be larger. In the illustrated embodiments, the distance E is about one-half inch.

Referring to FIGS. 2 and 3, the plate 27 defines a center opening 35 configured to allow the output shaft 24 pass through the blade guard 25. A plurality of mounting holes 36 are defined by the blade guard 25 for receiving the bolts 30 and mounting the blade guard 25 to an underside surface 19 of the power head assembly 16.

The plate 27 of the blade guard 25 defines a plurality of shear teeth 40 and shear pockets 38 formed along the perimeter 39 of the plate. As shown in FIGS. 3 and 8, the shear pockets 38 each define a partial oval shape having a center point offset axially inwardly from the perimeter of the plate 27. In one embodiment, the shear pocket 38 is defined by about eighty to eighty-five percent of the length of the oval shape. Thus, in the illustrated embodiment, the shear opening 38 is defined by an oval shape less about 15-20 percent of the length of the full oval. Each of the shear pockets 38 extend inwardly from the perimeter of the plate and are longitudinally centered about a radius R of the plate 27. Each of shear pockets 38 forming an opening for grass and/or other vegetation to enter for engaging the cutting blade 20. Each of the shear teeth 40 being disposed between two adjacent shear pockets 38. Each shear tooth 40 includes opposing hooks 43 disposed at the perimeter of the plate 27. Each hook 43 defined by the periphery of the plate 27 one side, and by the adjacent shear pocket 38 on the other side. Each hook 43 formed by one of the shear teeth 40 cooperating with the opposing hook 43 on an adjacent shear teeth 40 to form the opening of the shear pocket 38 defined between the said two adjacent shear teeth 40, 40. The hooks 43 for catching and/or pulling grass and brush within the adjacent shear pockets 38 and also works to hold the vegetation within the shear pocket. In other embodiments, the shear hooks 43 may be shaped differently or define a cutting edge for improving the cutting action of the cutting blade 20. In one embodiment, the edges of the shear hooks 43 are blunt wherein the vegetation and/or brush is cut by the cutting blade 20 while the vegetation, grass, etc. is pushed against the shear hooks 43 and blade guard 25 and cut in a shearing action. In other embodiments, the shear pockets 38 may be shaped differently than an elliptical shape such as, circular, rectangular, triangular, for example.

Figure 4:
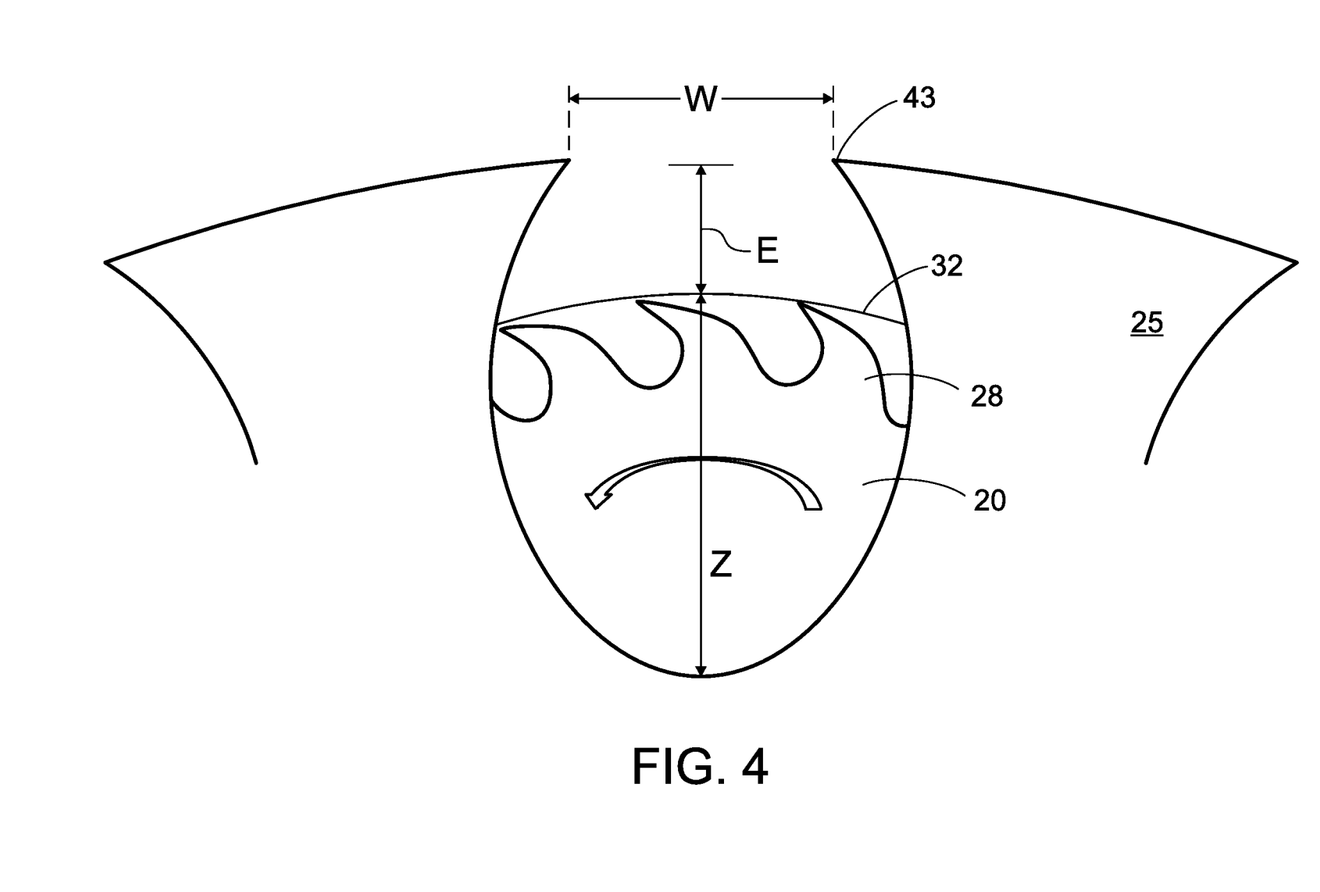
FIG. 4 is a partial detail view of a top side of a blade guard and cutting blade in accordance with the present invention.
Figure 5:
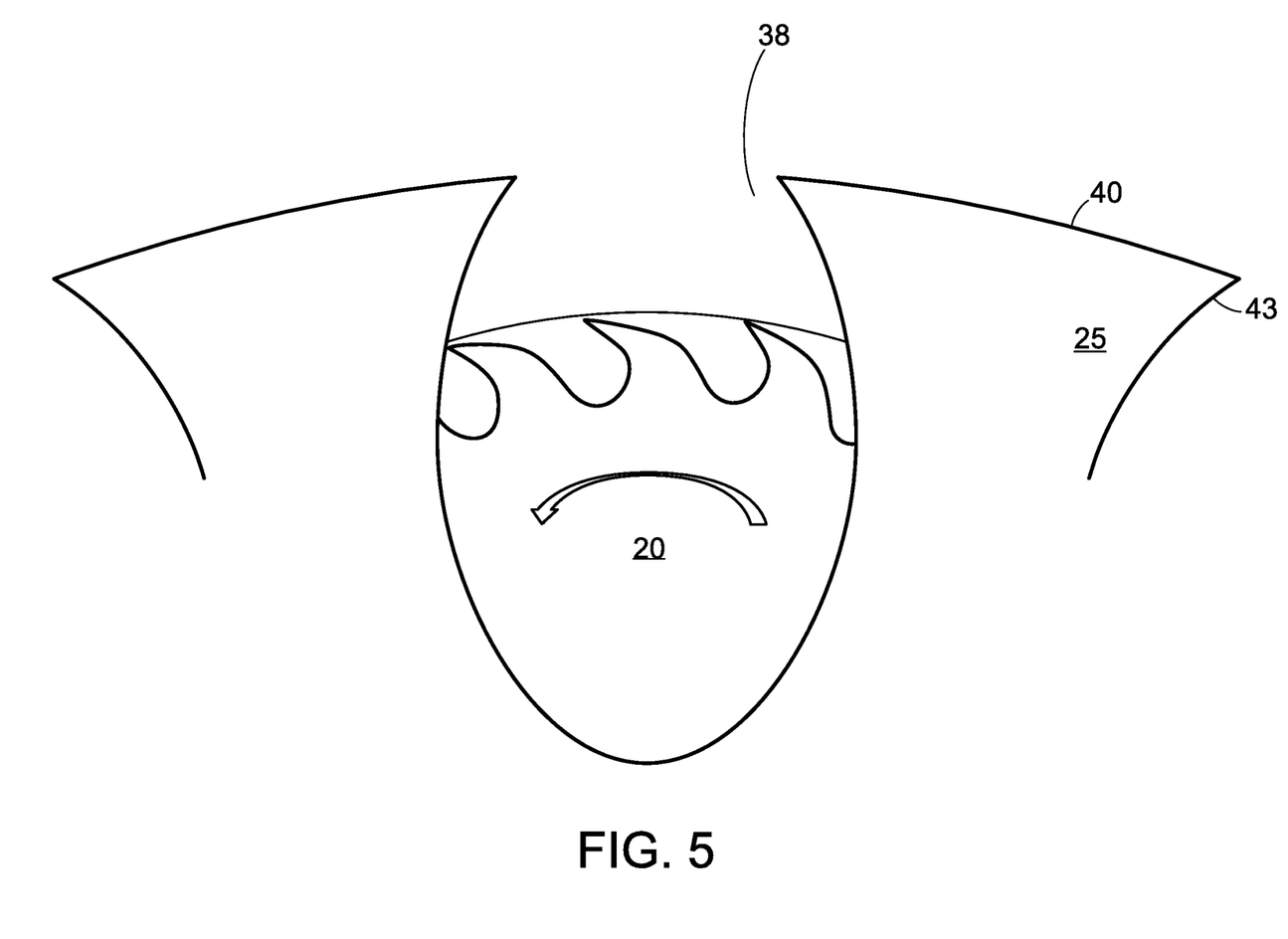
FIG. 5 is a partial detail view of a top side of another embodiment of a blade guard and cutting blade in accordance with the present invention.

FIGS. 4 and 5 provide detailed views of the relative positions of the blade guard 25 and cutting blade 20 of the vegetation trimmer 10. As shown, the difference in the diameter of the saw blade 20 and the blade guard 25 is labeled E and includes a setback distance of about one-half inch (½") in the FIGS. 4 and 5 embodiment. As shown in FIGS. 4 and 5, the shear pocket positioned between two adjacent shear teeth 40 allows the grass, vegetation or brush, etc., to enter the opening W of the shear pocket 38. In one embodiment, the opening W of the shear pocket is approximately ⅞ inches across. The opening W of the shear pockets 38 is designed to be large enough to allow grass, brush, vegetation into the shear pocket to be cut by the cutting blade 20 and also small enough for safe use and to prevent the cutting blade 20 from contacting anything which is not intended to be cut. In an embodiment of the vegetation trimmer 10 for use with new plantings, e.g. saplings, the width W of the opening in the shear pocket 38 is narrow so as to allow an operator of the trimmer to remove vegetation abutting the sapling but prevent the sapling from entering the shear opening. Thus, in various embodiments the width W of the shear opening may be larger or smaller depending on the application for the vegetation trimmer 10. A depth of the shear pocket 38 measured inwardly from the circumference of the blade guard 25 towards a center point and along a radius of the blade guard may be in the range of 1.25" to 2.5" depending on the size of the blade or vegetation trimmer and the application for use thereof. Also shown in FIGS. 4 and 5 is the depth of the pockets that allow for the separation and dispersal of cut material.

In another embodiment of the vegetation trimmer 10, a restrictor plate (not shown) can be coupled to the power head assembly 16 adjacent to the blade guard 25 for reducing the size of the shear openings. The restrictor plate defining a number of slots, one each corresponding to each of the shear openings 38. The restrictor plate being alignable with the blade guard 25 to effectively reduce the size of the opening of the shear pockets for restricting access thereto for certain vegetation. As mentioned above when the vegetation trimmer may be used with saplings for example, a restrictor plate may be employed to prevent the saplings from entering the shear pockets 38 for protecting the saplings from being mistakenly cut with the vegetation trimmer 10.

Figure 7:
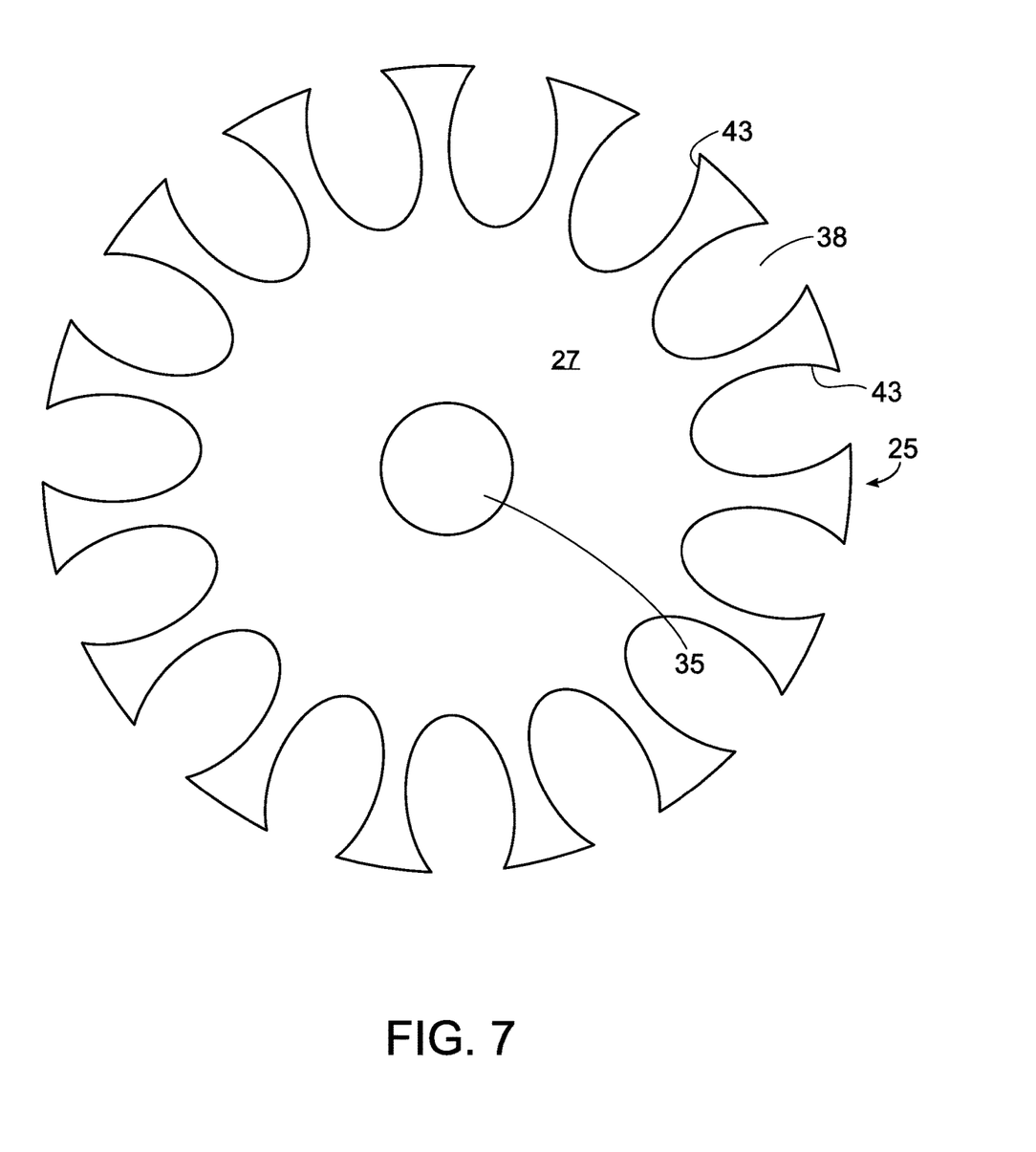
FIG. 7 shows a top view of one embodiment of a blade guard in accordance with the present invention.

FIG. 7 shows one embodiment of a-blade guard 25 in accordance with the present invention wherein there are fifteen (15) shear openings 38 spaced about the circumference of the circular plate 27. Each of the shear openings 38 being oval shaped and centered longitudinally along a radius R of the circular plate 27. Other embodiments may have fewer or more shear openings with differing shapes and spacings about the circumference of the circular plate 27. In one embodiment the circular plate 27 is formed of an industrial strength aluminum plate of a thickness in a range of about 1/16" to about 3/16". In other embodiments the blade guard 25 can be formed of other materials such as plastic, fiberglass or other metals or metal alloys having a thickness of appropriate for the material and/or application or size of the vegetation trimmer.

The rotation of the cutting blade 20 causes air flow which tends to move grass and vegetation near the blade guard 25 into the shear pockets 38 for engaging the rotating cutting blade 20 wherein the grass and/or vegetation are cut in a shearing action between the rotating cutting blade 20 and the blade guard 25 including the shear teeth 40, 43 which surround the shear openings 38.

In using the vegetation trimmer 10, an operator moving the power head assembly 16 including the cutting blade 20 and blade guard 25 in a side to side and or in an omnidirectional motion will also aide in causing vegetations and/or grass or brush desired to be cut to enter the shear pockets 38 of the blade guard. The vegetation trimmer 10 can be used in any orientation, however, typically the cutting blade 20 should be positioned generally perpendicular to the vegetation, grass or brush to be cut with the vegetation trimmer.

Figure 6:
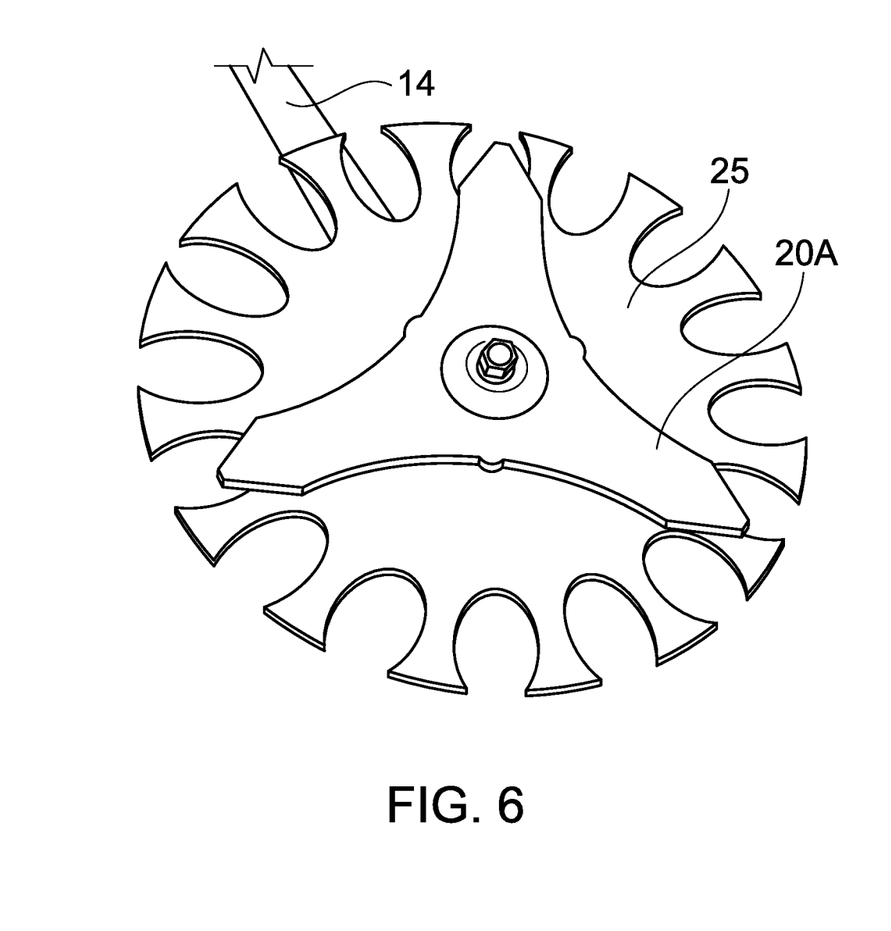
FIG. 6 shows an underside perspective view of the blade end of a vegetation trimmer in accordance with the present invention.

As shown in FIG. 6, the cutting blade 20A is a three-pointed brush cutter blade, whereas the cutting blade 20 is circular trimmer blade. As known to one skilled in the art, various types of cutting blades 20, 20A with different numbers, and configurations of cutting teeth can be used with the vegetation trimmer 10. Each of the cutting blades 20, 20A have different configurations designed for different vegetation cutting applications. The cutting blades 20, 20A are shown as examples of various blades which can be used with the vegetation trimmer 10 of the present invention.

Figure 9:
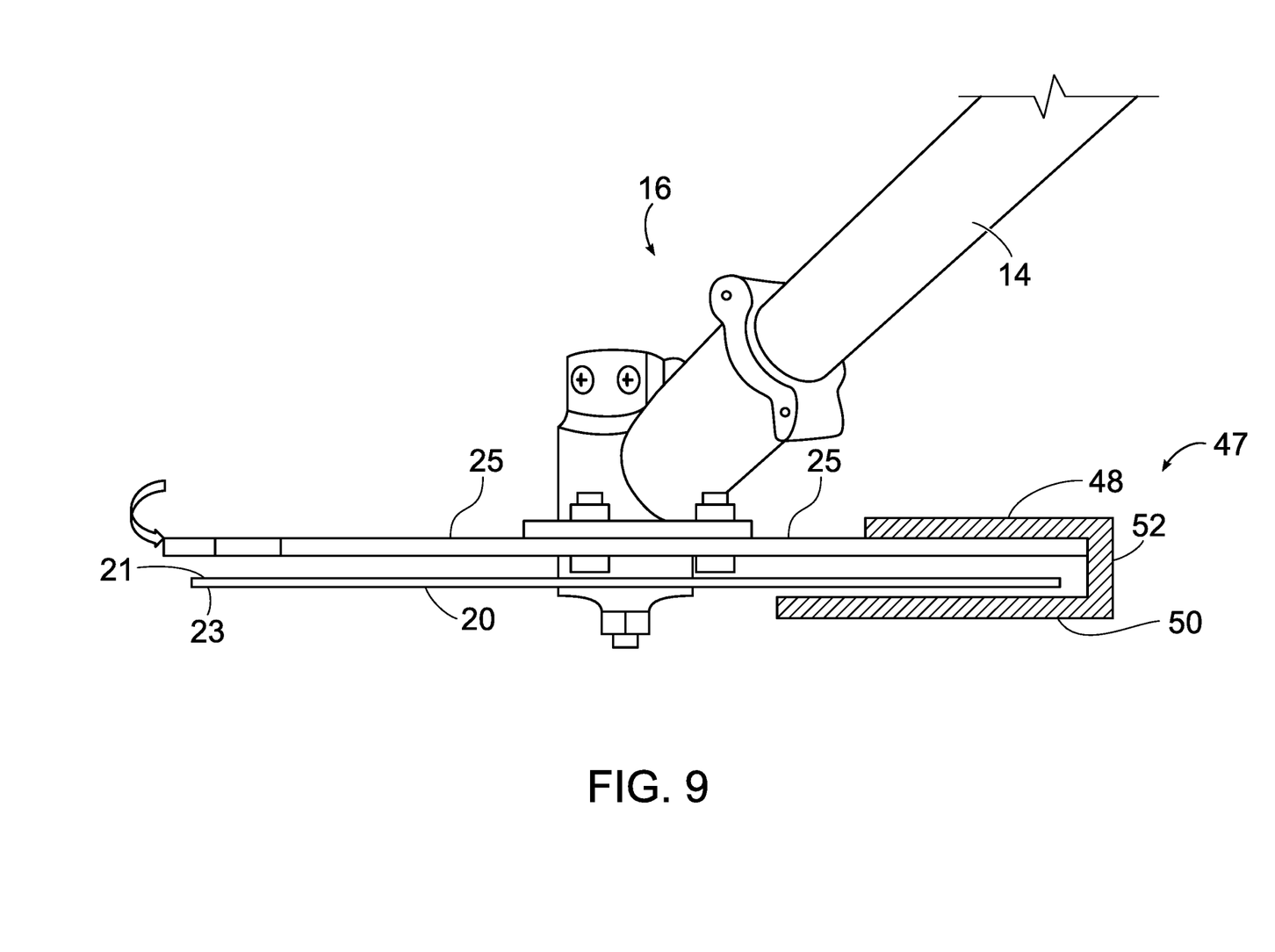
FIG. 9 is a perspective view of a power head assembly of a vegetation trimmer in accordance with the present invention including a foot guard shown attached to the blade guard.

Referring to FIG. 9, the vegetation trimmer 10 optionally includes a foot guard 47 attached to the blade guard 25 for protecting the legs or feet of a user of the vegetation trimmer. The foot guard 47 includes a semi-circular upper plate 48 attached to the blade guard 25 and a semi-circular lower plate 50 extending along a portion of the cutting blade 20 and spaced apart from the lower side of the cutting blade 23. The lower side 23 of the cutting blade 20 is the side of the blade facing away from the blade guard 25. The foot guard 47 further includes an edge 51 connected between the upper and lower plates 48, 50 respectively of the foot guard. The edge 51 is spaced apart from and edge of the cutting blade 20 as shown in FIG. 9. In one embodiment, the foot guard extends circumferentially along a portion of the blade guard 25 for preventing the legs or feet of a user from contacting the blade 20. In one embodiment, the upper and lower plates of the foot guard 48, 50 define a plurality of openings aligned with the shear openings 38 to allow any grass, vegetation, brush, or vines etc. to enter the shear openings as discussed herein above. In one preferred embodiment, the foot guard 47 extends about ⅓ of the circumference of the blade guard 25 and cutting blade 20. In other embodiments, the foot guard can extend between about one-fourth to about one-half of the circumference of the cutting blade 20 and blade guard 25.

Figure 10:
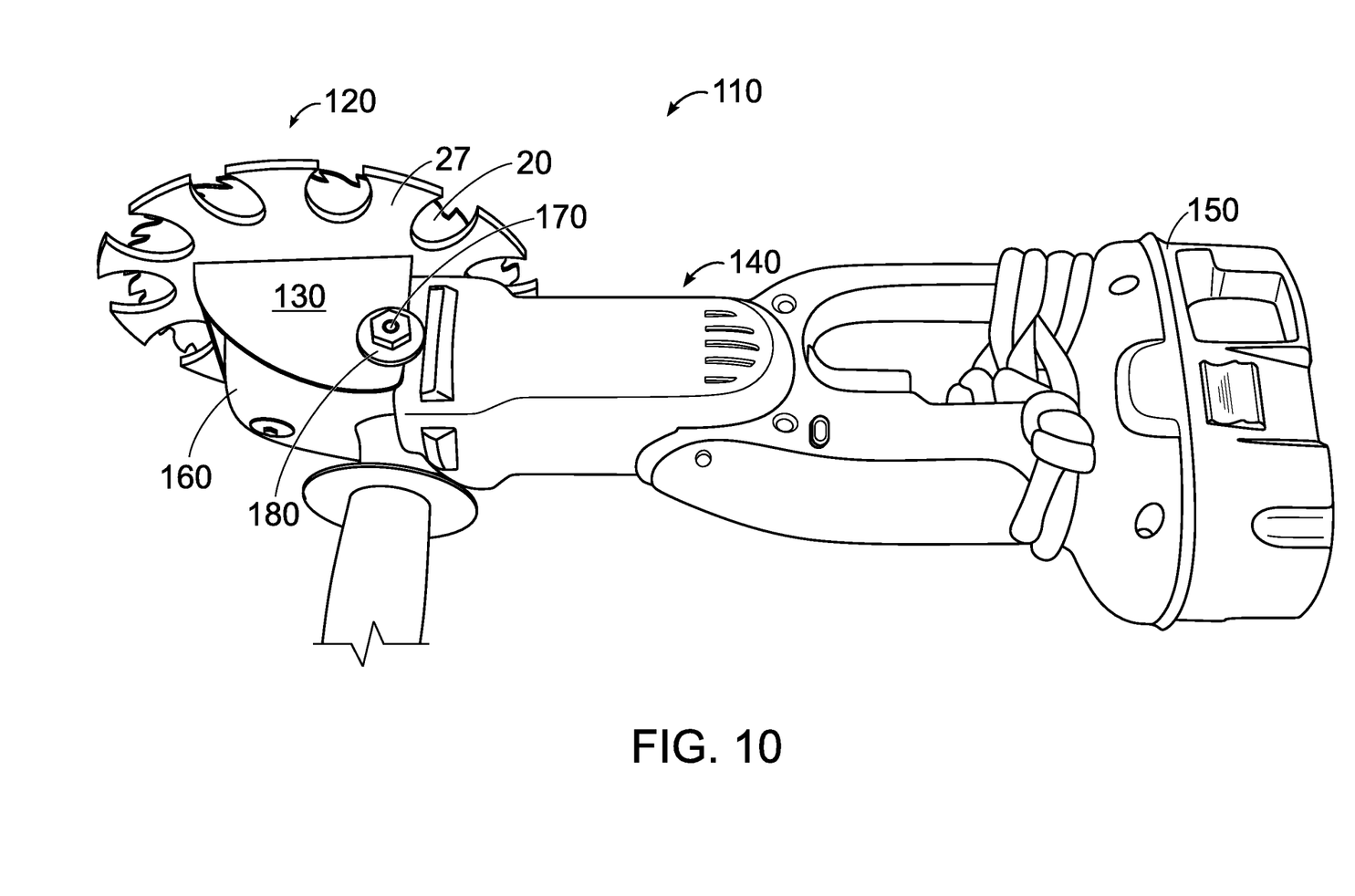
FIG. 10 is a rear side perspective view of a hand-held vegetation trimmer according to the present invention.
Figure 11:
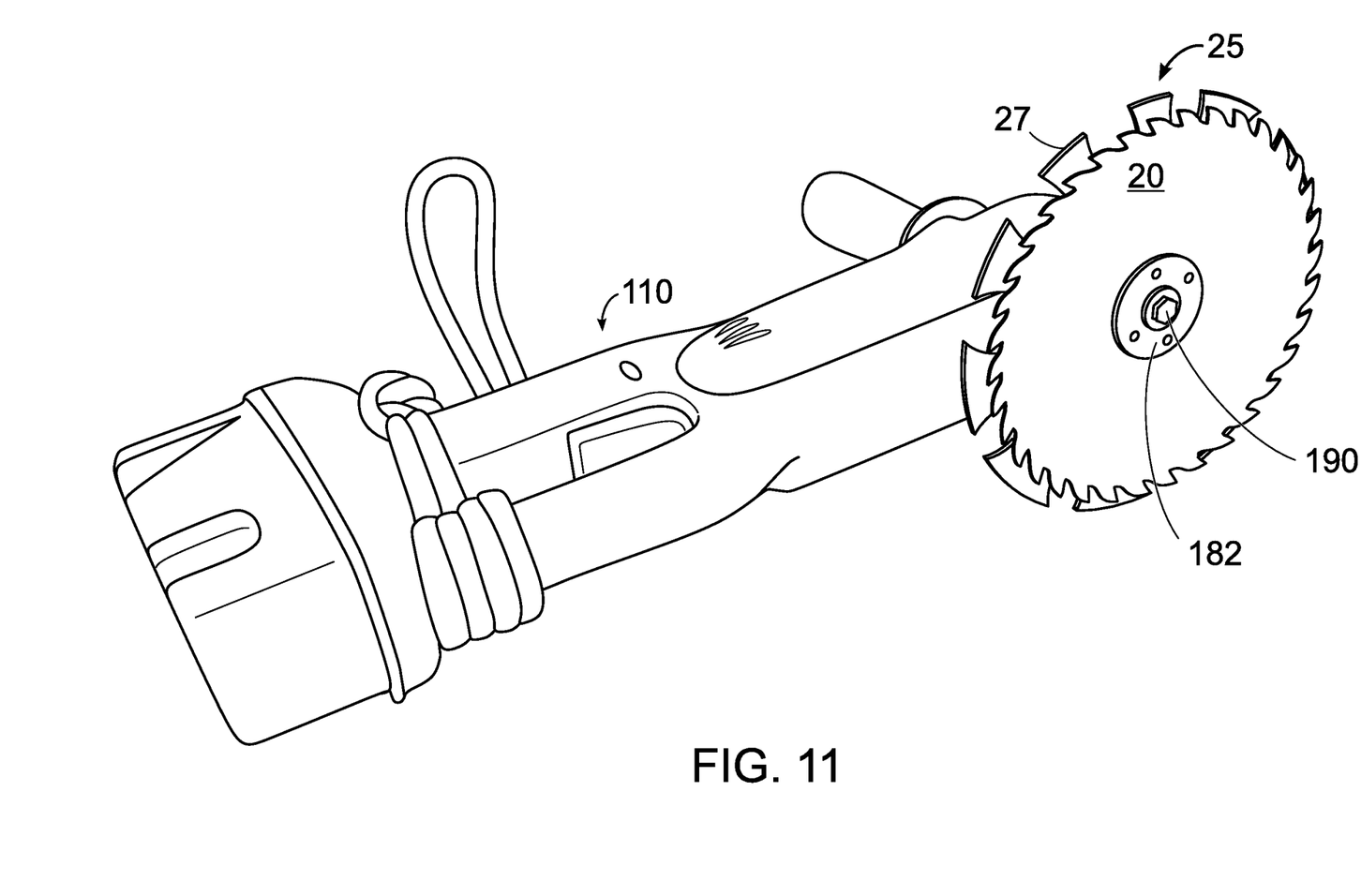
FIG. 11 is a front side perspective view of the hand-held vegetation trimmer of FIG. 10.

FIGS. 10 and 11 show another embodiment of a vegetation trimmer 110 in accordance with the present invention. The vegetation trimmer 110 includes a vegetation trimmer assembly 120 consisting of blade guard 25, blade 20, circular plate 27, and attachment bracket 130. Circular plate 27 is removably coupled to bracket 130 with fasteners (not shown). attached to a hand-held driver 140 including a power source 150 and motor drive assembly 160, the motor drive assembly including drive shaft 190. The trimmer assembly 120 is coupled to hand-held driver 140 by bolts 170 and washers 180 through holes (not shown) in bracket 130. In the example embodiment the blade 20 is secured to drive shaft 190 between an inner flange nut (not shown) and an outer flange nut 182.

The hand-held vegetation trimmer 110 is used in the same manner as described above on for use on shrubbery or other work wherein the vegetation to be cut is off of the ground or difficult to cut with the vegetation trimmer 10 designed to cut vegetation that is near to the ground.

Example embodiments and methods thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A vegetation trimmer having a blade guard comprising:
a drive motor;
an elongated drive shaft coupled to the drive motor, the drive shaft disposed in an elongated shaft housing having first and second ends, the first end of the shaft housing coupled to the drive motor;
a power head assembly coupled to a second end of the shaft housing;
a blade guard defining a circular plate coupled to the power head assembly;
a cutting blade attached an output shaft of the power head assembly for rotation relative to the blade guard, the blade guard disposed between the cutting blade and the power head assembly:
the blade guard disposed generally parallel to the cutting blade and spaced apart from the cutting blade, the blade guard defining a plurality of spaced apart shear pockets disposed about a circumference of the circular plate, each of the shear pockets forming a partial oval, the blade guard comprising a plurality of shear teeth, each of the shear teeth being disposed between two adjacent shear pockets, each shear tooth including opposing identical hooks disposed at a perimeter of the blade guard, each hook defined by a periphery of the circular plate on one side, and by an upper bending curve of the partial oval of an adjacent sheer pocket on an opposite side;
the cutting blade being rotatable relative to the blade guard for cutting vegetation within a shear pocket when the vegetation trimmer is operational.

2. The vegetation trimmer according to claim 1 wherein a diameter of the blade guard is greater than a diameter of the cutting blade.

3. The vegetation trimmer according to claim 1 wherein each of the shear pockets defines a center line positioned along a radius of the blade guard.

4. The vegetation trimmer according to claim 1 wherein the blade guard defines fifteen shear pockets disposed about a circumference thereof.

5. The vegetation trimmer according to claim 1 wherein the blade guard defines a plurality of mounting holes for attaching the blade guard to the power assembly.

6. The vegetation trimmer according to claim 1 further comprising a foot guard mounted to the blade guard and enclosing at least a portion of the cutting blade.

7. A power head assembly for use with a vegetation trimmer comprising:
a coupler for attaching the power head assembly to a shaft housing of a vegetation trimmer;
a drive gear connectable to a drive shaft of a vegetation trimmer;
a blade guard defining a circular plate coupled to the power head assembly;
a cutting blade attached an output shaft of the power head assembly for rotation relative to the blade guard, the blade guard disposed between the cutting blade and the power head assembly;
the blade guard disposed generally parallel to the cutting blade and spaced apart from the cutting blade, the blade guard defining a plurality of spaced apart shear pockets disposed about a circumference of the circular plate, each of the shear pockets forming a partial oval, the blade guard comprising a plurality of shear teeth, each of the shear teeth being disposed between two adjacent shear pockets, each shear tooth including opposing identical hooks disposed at a perimeter of the blade guard; each hook defined by a periphery of the circular plate on one side, and by an upper bending curve of the partial oval of an adjacent sheer pocket on an opposite side;
the cutting blade being rotatable relative to the blade guard for cutting vegetation present in the shear pockets.

8. The power head assembly according to claim 7 wherein a diameter of the blade guard is greater than a diameter of the cutting blade.

9. The power head assembly according to claim 7 wherein each of the shear pockets defines a center line positioned along a radius of the blade guard.

10. A hand-held vegetation trimmer having a blade guard comprising:
a drive motor coupled to, and powered by a battery;
a handle portion disposed between the battery and the drive motor;
an output shaft coupled to the drive motor;
an attachment bracket coupled to the vegetation trimmer near the output shaft;
a blade guard defining a circular plate coupled to the attachment bracket;
a cutting blade mounted to the output shaft for rotation relative to the blade guard via power from the drive motor, the blade guard disposed between the cutting blade and the power head assembly;
the blade guard disposed generally parallel to the cutting blade and spaced apart from the cutting blade, the blade guard defining a plurality of spaced apart shear pockets disposed about a circumference of the circular plate, each of the shear pockets forming a partial oval, the blade guard comprising a plurality of shear teeth, each of the shear teeth being disposed between two adjacent shear pockets, each shear tooth including opposing identical hooks disposed at a perimeter of the blade guard each hook defined by a periphery of the circular plate on one side, and by an upper bending curve of the partial oval of an adjacent sheer pocket on an opposite side;

the cutting blade being rotatable relative to the blade guard for cutting vegetation present in the shear pockets when the vegetation trimmer is operational.

11. The hand-held vegetation trimmer according to claim 10 wherein a diameter of the blade guard is greater than a diameter of the cutting blade.

* * * * *